United States Patent [19]

Minot

[11] Patent Number: 5,481,604
[45] Date of Patent: Jan. 2, 1996

[54] TELECOMMUNICATION NETWORK AND SEARCHING ARRANGEMENT FOR FINDING THE PATH OF LEAST COST

[75] Inventor: Joel Minot, Charenton, France

[73] Assignee: U.S. Philips Corporation, New York, N.Y.

[21] Appl. No.: 214,880

[22] Filed: Mar. 15, 1994

[30] Foreign Application Priority Data

Mar. 17, 1993 [FR] France ................................ 93 03086

[51] Int. Cl.$^6$ ................................................ H04M 15/32
[52] U.S. Cl. .................... 379/221; 379/220; 379/112; 379/114; 379/115; 379/201
[58] Field of Search ................................ 370/220, 221, 370/201, 229, 94.1; 379/112, 114, 115, 220, 221, 201, 229

[56] References Cited

U.S. PATENT DOCUMENTS

| | | | |
|---|---|---|---|
| 4,741,027 | 4/1988 | Maisel et al. | 379/221 |
| 4,831,649 | 5/1989 | Mejane | 379/220 |
| 4,905,233 | 2/1990 | Cain et al. | 370/94.1 |
| 5,031,093 | 7/1991 | Hasegawa | 370/17 |
| 5,058,105 | 10/1991 | Monsour et al. | 379/221 |
| 5,101,451 | 3/1992 | Ash et al. | 379/221 |
| 5,142,531 | 8/1992 | Kirby | 370/94.1 |
| 5,163,042 | 11/1992 | Ochiai | 379/220 |

FOREIGN PATENT DOCUMENTS 0276754 8/1988 European Pat. Off. .

OTHER PUBLICATIONS

"Cellular Automata Models of Disorder and Organization", by G. Y. Vichniac, NATO ASI Series, vol. F20, Springer-Verlag, Berlin, 1986, pp. 3–20.

"Description et comparaison des algorithmes de calcul de l'arbre des plus courtes routes" by G. Scheys, Technical Note, Philips Research Lab., Brussels, May 1991.

Primary Examiner—Jeffrey A. Hofsass
Assistant Examiner—Parag Dharia
Attorney, Agent, or Firm—David R. Treacy; Richard A. Weiss

[57] ABSTRACT

The arrangement is formed by the presence in each node of the network of a cellular automaton comprising cells (0 to 8) interconnected by lines, so that the entirety of the cells and of the lines represents the nodes and the links respectively of the network while each cell comprises calculating means for calculating the cost of a path, works asynchronously, and communicates with each of its nearest neighbouring cells and only with them. When the arrangement is simulated in a sequential machine, this machine is programmed to choose the order in which the cells are activated on the basis of the minimum number of links to be passed through to connect two nodes, which nodes are determined by having the cellular automaton turn when the states of the links are mutually equal.

18 Claims, 5 Drawing Sheets

TELECOMMUNICATION NETWORK AND SEARCHING ARRANGEMENT FOR FINDING THE PATH OF LEAST COST

BACKGROUND OF THE INVENTION

The present invention relates to a telecommunication network comprising nodes interconnected by paths or links and including a searching arrangement for finding the path of least cost, which arrangement performs an adaptive and decentralized search while cognizance of the overall state of the network is available in each of the nodes.

In a telecommunication network such a searching arrangement is used for finding the best path between two nodes, a node in this case being a channel switch which can be a transmitter and/or a receiver.

The invention likewise relates in a more general way to an adaptive and decentralized searching arrangement for finding the best path in a network that comprises nodes interconnected by links while cognizance of the overall state of the network is available in each of the nodes.

Such a search has been made for a long time in the scope of optimization of systems, specially transport systems.

A communication routing method for a self-switching network is known from document EP-A-0 276 754. In this arrangement an algorithm known as "Dijkstra's" algorithm is used. It is about defining a shortest path routing tree: such a tree has its root at the starting node under consideration, its branches are paths of the network and its forks correspond to nodes of the network which are encountered via the paths, and it shows the best paths between this starting node and each of the other nodes of the network. Since it shows the best paths, it is only valid at a given moment as a function of the loads of the various paths at that moment. Dijkstra's algorithm is an iterative algorithm according to which, for each iteration, a list of nodes is updated which are likely to form part of a shorter path starting from the given node called "root node". A detailed embodiment for this algorithm will be described hereinafter.

Variants of Dijkstra's algorithm are related to modifying the order in which veins of an artery leaving a given node are scanned and also to the number of scannings of these branches. For a proper synthesis with the prior art the document "Description et comparaison des algorithmes de calcul de l'arbre des plus courtes routes" by G. SCHEYS, Technical Note, Philips Research Lab., Brussels, May 1991, may be referred to.

SUMMARY OF THE INVENTION

The invention provides a faster arrangement than those of the prior an, because each of the nodes comprises a cellular automaton formed by cells interconnected by links, so that the entirety of cells and links represents the nodes and links respectively of the network, each cell comprising calculating means for calculating the cost of a path, and each cell communicating with its nearest neighbours.

Hopfield and Tank have truly succeeded in resolving this kind of routing problem by means of a neural network. However, the results obtained were not fully satisfactory, especially because such an arrangement is delicate to use and is not very robust with respect to noise. The difference between a neural network and the cellular automaton used in the invention is that the neural network is organized in parallel layers with synaptic weights between the neurons and makes a preliminary training necessary, whereas the switch is organized topologically as the reproduction of the network to be optimized, does not comprise synaptic weights and does not need training, but, in contrast, its cells are more complex than the neurons as each one of these cells comprises calculating means for calculating the least cost of a path.

Preferably, the calculating means for calculating the least cost of a path in a cell of a cellular automaton works asynchronously with respect to those of the other cells and the calculating means for calculating the cost of a path in a cell communicates with the neighbouring cells only.

When the cellular automaton is simulated in a sequential machine, the latter is advantageously programmed to choose the order in which the cells are activated on the basis of the minimum number of links to be passed through to connect two nodes.

To choose the order in which the cells are activated on the basis of the minimum number of links to be passed through to connect two nodes, the machine is advantageously programmed to make the cellular automaton run when the states of the links are mutually equal.

An adaptive and decentralized searching arrangement with cognizance of the whole network being available in each of the nodes is characterized in that each of the nodes of the network comprises a cellular automaton formed by cells which are interconnected by links, so that the entirety of cells and links represents respectively the nodes and links of the network, while each of the cells comprises calculating means for calculating the cost of a path and communicates with each of its nearest neighbours.

These aspects of the invention as well as further, more detailed, aspects will become clear from the following description of a non-limiting embodiment.

DESCRIPTION OF THE PREFERRED EMBODIMENT

The routing mechanism is an important aspect in a telecommunication network. This mechanism is in fact a means for determining or selecting the path of least cost to transfer dam between two nodes (switches). This selecting means has a predefined strategy of which the object can be the minimization of the number of switches passed by the signal, the minimization of the transmission cost, of the transmission delay, of the error rate, . . .

There are several methods to resolve such a problem:

1) FIXED ROUTING: The routing is called fixed when there is only a single route possible between two switches. Routing Tables are precalculated and filled according to the configuration. Since the fixed routing does not allow any alternative route, it is only valid if the traffic is very stable and the network reliable.

2) DYNAMIC ROUTING: As for the fixed routing, routing Tables are precalculated. However, alternative predefined solutions can be proposed when problems occur.

3) ADAPTIVE ROUTING: Contrary to the two preceding methods, this type of routing adapts itself to fluctuations of traffic. The method supposes a real-time updating of the routing Tables. It is thus necessary for the routing operation to be capable of recovering information on the state of one part of the network (or of the whole network), calculating the routes and converting them into routing Tables. Furthermore, the routing decision can be taken in a centralized or decentralized way:

3-a) centralized decision: the routing algorithm is accommodated in a single system which generally has a large calculating capacity. This system knows the state of the whole network and calculates the routing Tables for all the nodes. The disadvantages of such an organization are a certain vulnerability (because the route-assisting node is essential), the possibility of an overload of communications at a point between the route-assisting node and the other nodes, and synchronization errors between nodes due to the transmission times of the routing Tables.

3-b) decentralized decision: in this case each node makes its own decision based on either a partial or a complete approximation. In the case of a partial approximation, that is to say, with cognizance in each node of the states of only the nearest nodes, the decisions are sub-optimum and the routes are not very consistent; in contrast, the calculation load is very low. Thus, the route between the transmitter and the destination is calculated by all the transitory nodes (distributed calculation).

In the case of a complete approximation, that is to say, with cognizance in each node of the states of all the other nodes, the decision is made from the moment a digital data packet is transmitted with a possible rerouting to the transitory nodes (local calculation), which provides consistent routes (that is to say, without loops). The routes have a good quality, but the traffic and the cost of calculation are more important.

Figure 1:
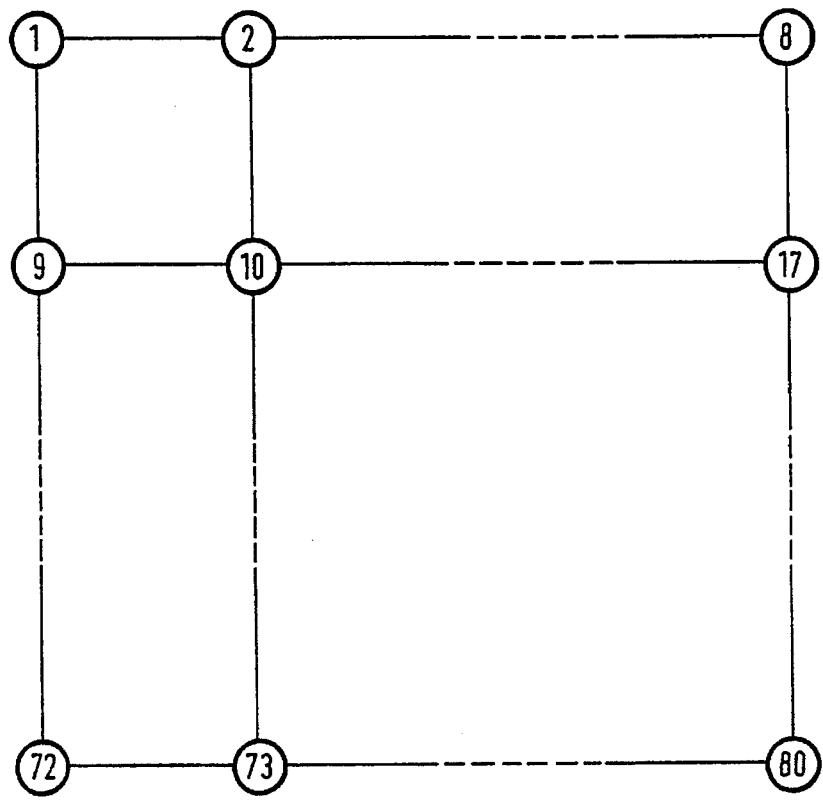
FIGS. 1, 2A, 3 are diagrams showing networks, and at the same time they represent the corresponding cellular automatons.
Figure 2A:
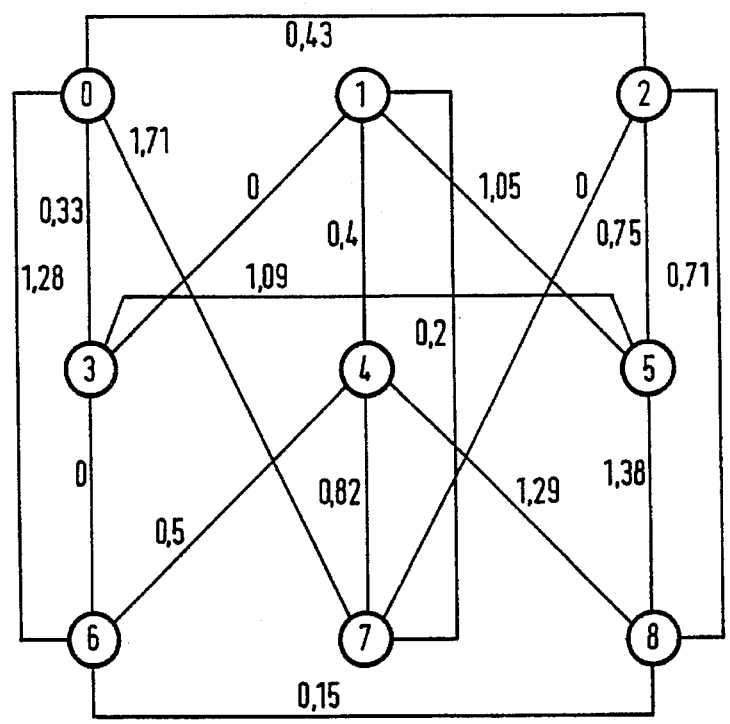
Figure 2B:
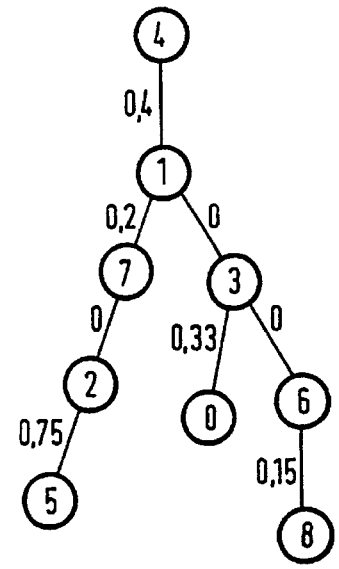
FIG. 2B illustrates a branch showing the shortest paths of the network of FIG. 2A.
Figure 3:
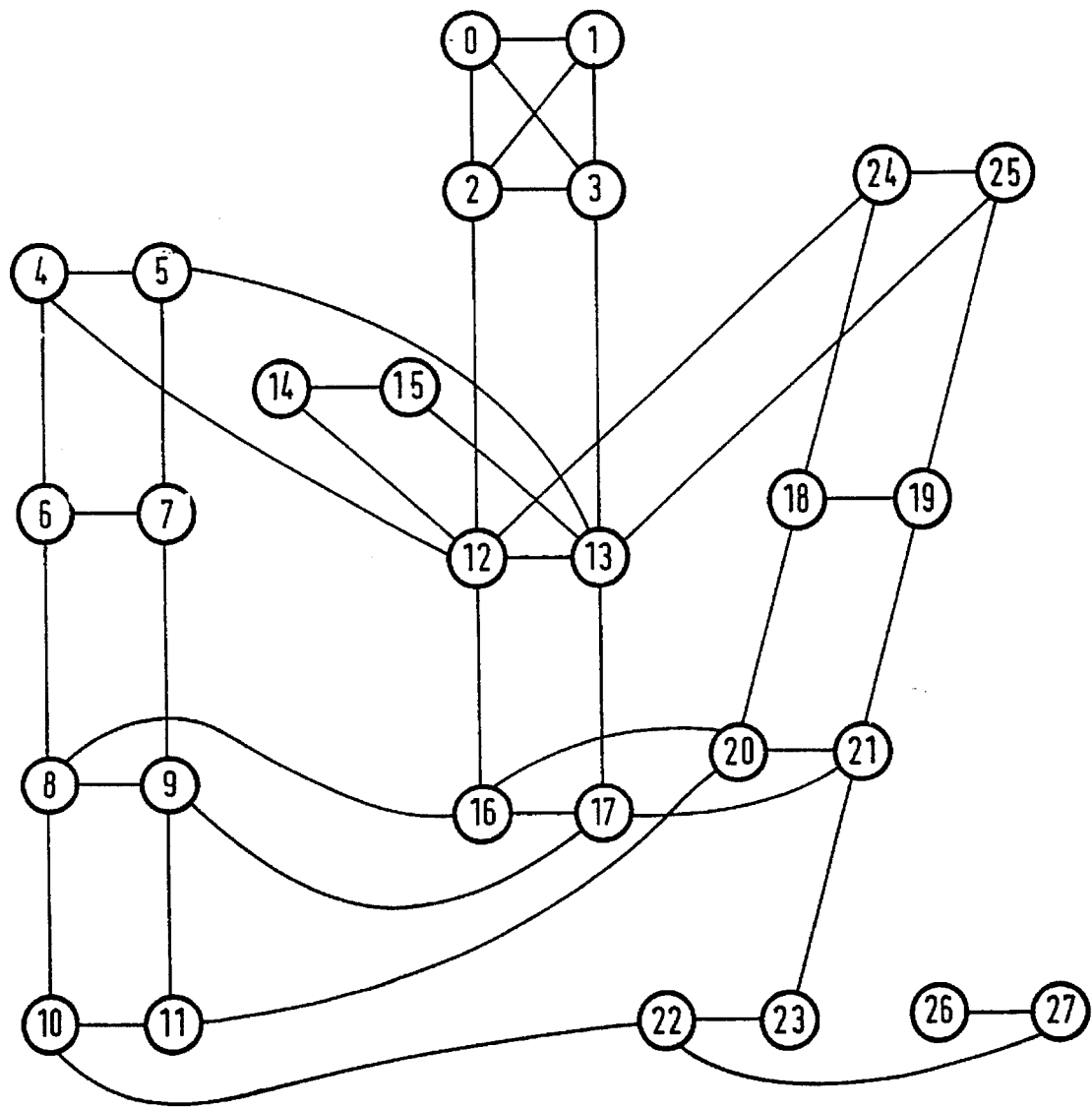

FIGS. 1 to 3 represent three different telecommunication networks:

—FIG. 1 represents a network having a number of N=81 nodes and k=3.55 (k= density factor), —FIG. 2A represents a network comprising N=9 modules and k=4, and the Figure shows an example of cost of the paths, —FIG. 3 represents a network of the type used among bridges in telecommunication networks in France, with N=28 nodes and k=3.14.

In the prior art an algorithm called Dijkstra's algorithm was used or one its variants. This algorithm is iterative and with each iteration a list of nodes is updated which nodes are likely to form part of a shorter path from a given node called "root" node. The length of each path between the root node and an arbitrary other node depends on this arbitrary node. These lengths are all initialized at an infinite value and the initial list comprises only the starting node. An iteration comprises the following operations: a node is taken from the list and the distances between the neighbours of this node (a node is a neighbouring one to another node if it is connected thereto by a direct link) and the root node are calculated by going down one level in the shortest path routing tree. Each neighbour whose path length is shorter than the calculated length up to that node is added to the list. The algorithm stops when the list is empty.

Let us assume that in the network of FIG. 2 node 4 is taken as the root node or as the starting node. At the beginning of the first iteration the list comprises only node 4. It is then taken from the list and the lengths of the paths from node 4 to its neighbours 1, 6, 7, 8 (which gives respectively: 0.4, 0.5, 0.82, 1.29) are calculated. As these lengths were initialized at an infinite value, the new lengths are shorter and the nodes 1, 6, 7, 8 are added to the list which at this stage thus only comprises these nodes. Node 1 is taken from the list and the lengths of the paths from node 4 via 1 to the neighbouring nodes of the latter: 3, 7, 5 are calculated. Since the lengths corresponding to nodes 3, 5, were initialized at an infinite value, the new lengths (0.4 and 1.45 respectively) are shorter and the nodes 3, 5 are added to the list. For node 7 the assigned length was 0.82 and becomes 0.6 (paths 4-1+1-7) and the assigned value is updated. The list now comprises the nodes 3, 5, 6, 7, 8. Node 3 is taken from the list and the lengths of the paths to the neighbouring nodes 0, 5, 6 of node 3 are calculated, counted from node 4 via 1 and 3 (that is to say, by descending one level in the shortest path routing tree). Since the corresponding length at node 0 was initialized at an infinite value, the new length is shorter and node 0 is added to the list. For the nodes 5, 6 the calculated lengths are 1.49 and 0.4 respectively, and since the assigned lengths were 1.45 and 0.5 respectively, the value for 6 (smaller now: 0.4 instead of 0.5) is updated and that for 5 is unchanged (1.45). With each update the path corresponding to the best value is noted down, assigned to the node of destination. The list now comprises the nodes 0, 5, 6, 7, 8. The same process will be continued by taking the nodes from the list in turns and by adding others as required. Since in the end it is no longer possible to add nodes as the network has no more nodes, whereas with each iteration step a node is taken away, the list will end up empty. In the selected example the assigned paths lead to the branch of the shortest paths represented by FIG. 2B, which corresponds obviously to the cost of the paths indicated in FIG. 2A.

The invention will now be described while the vocabulary of a telecommunication network is used. The routing is adaptive and decentralized while cognizance of the overall state of the network is available in each of the nodes. On the basis of the information describing the state of the links (i.e. "out of operation" "in operation") between switches, each switch calculates the shortest path routing tree to the set or switches.

The principle of a search for the shortest path by a cellular automaton is the following: the network is represented in each of the nodes by a structure called cellular automaton, formed by non-linear elements generally all identical and in which each element called cell communicates with its nearest neighbouring cell only. The cellular automatons in each of the nodes are all identical, with the exception of the choice of the root node of the tree which is each time the node under consideration.

Thus, each switch i of the network (for example, i=0 to 8 in FIG. 2A) is modelled after a cell i in the switch. The communication between two neighbouring cells i and j of the cellular automaton is only authorized if the equivalent switches i and j of the network are physically connected (for example, the switches 1–3 in FIG. 2A, but not the switches 3–4).

The following describes the operation of the system in switch "s", that is to say, the structure of the shortest path routing tree starting from "s". There is supposed to be known is the matrix $C(t=(C_{ij})t)$ of the states of the links between two nodes i and j at each instant t (t can be a function, for example, of the updated frequency $C_{ij}(t)$ in the network).

Depending on the official recommendations (ISO standard 8473) for the optimization of resources, $C_{ij}(t)$ can be a function of the number of logic channels available in i, of the number of buffer memories occupied in the waiting lists in i, of the work load of i and of the available rate on the line i–j.

Each cell j is to minimize the distance between s and itself and this as a function of the information supplied by its neighbouring cells. The distance between two nodes s and j is given by the sum of the cost $C_{ik}(t)$ which corresponds to links i–k traversed along a path between s and j. A cell i is close to j if it is directly connected by a link having value $C_{ij}(t)$ to the cell j.

The description of the operation of a cell i of the cellular automaton located in the change-over switch "s" comprises the following four steps:

1) initialization:
   (a)—of the iteration counter: k(i)=1,
   (b)—of the length of the temporary path between s and i with the iteration 0: $L_{si}^0(t)=\infty$.

2) relaxation: cell i recovers the route length calculated with the preceding iteration $L_{sip}^{K(i)}(t)=L_{si}^{K(i)-1}(t)$
   For all the neighbouring cells j of cell i:
   (a)—cell i recovers the temporary value $L_{sj}^{k(j)}(t)$ which expresses the temporary cost of the path between the nodes s and j.
   (b)—cell i adds to this temporary cost the cost $C_{ji}(t)$ of communication from j to i to produce the temporary value of the path from s to i via j.
   (c)—cell i stores the temporary value $L_{si}^{k(i)}$ which is given by $\min(L_{sj}^{k(j)}(t)+C_{ji}(t), L_{si}^{k(i)}(t))$ and also stores which the neighbouring cell j is that permits this value to be minimized locally.

3) then, when all the neighbouring cells j have been searched once, cell i broadcasts the minimum value $L_{si}^{k(i)}$ thus found to its neighbouring cells j.

4) then the counter of iterations k(i)=k(i)+1 is incremented and cell i loops back to said stage 2 without waiting for a possible synchronization signal among all the cells of the switch (asynchronism of the cellular automaton).

The operation of the whole cellular automaton is as follows: All the cells i operate asynchronously and converge towards a minimum $L_{si}^{\infty}(t)$. The switch reaches a stable state when all the cells i simultaneously see their minimum value $L_{si}^{k(i)}$ unchanged from one iteration (k(i)) to the next (k(i)+1), that is to say, that for i:

$$L_{si}^{k(i)}(t)=L_{si}^{k(i)+1}(t)$$

This test is carried out between stages 3 and 4 of the process described hereinbefore.

The convergence of the algorithm towards a coarse minimum for all the elements i of the switch can be proved with the hypothesis that all the $C_{ij}(t)$ are positive.

The parallel process is accommodated in a sequential machine according to the following rules:

In order to determine the shortest path routing tree starting from a node s, each cell is sequentially activated (that is, its processing is performed) because activation in parallel cannot be realised. However, in order to accelerate the calculation, the order in which the cells are activated is selected in a particular manner: the order in which the cells are activated is determined by the minimum number of links to be traversed to connect the cells to cell "s". The priority in the order can thus be determined when the node is initialized (during the installation of the network or after a change), and possibly redefined in real-time.

Therefore, the same algorithm as for the calculation of the shortest paths is applied except that the cost of the links is taken to be equal to 1.0 (if the states of the links are all equal to 1.0, the total cost $L_{si}^{\infty}(t)$ directly gives the minimum number of links to be traversed for a connection between the nodes s and i), and that a random order for activating the cells is used. The values of the states of the links may, for that matter, instead of being equal to 1, be equal to a random value, but the same for all the links and independent of the traffic inside the network. When the cellular automaton operates with values of 1.0, each cell reads the values of the neighbouring cells, adds 1.0 to each of them and retains the smallest value. In this manner each cell obtains on convergence a value equal to the value produced by the neighbouring cell, plus 1.0. The value obtained for each cell is thus equal to the number of links crossed between the base (s) and this cell. A list of cells is then made up arranged in the order of enhancing values.

The order in which the cells will be examined in the following phases is now defined by this cell list. In the following phases, in which the shortest permanent paths are thus searched for, that is to say, with real $C_{ij}$ when the switch operates in a normal fashion, first only the neighbouring cells of "s" calculate the respective cost between "s" and themselves. There is no need for the other cells to do this, because they would sum infinite values (remember: $L_{si}^{k(i)}(t)=\infty$ on initialization). Then, with the second iteration, only the cells in the neighbourhood of "s" and the cells close to these neighbouring cells of "s" will be examined and the same holds for the next iterations. It has been observed that this heuristic method permits the acceleration of the speed of convergence by a factor of 2 or 3 relative to a random order of activation.

The additional coding cost caused by such a method is minimal because determining the minimum number of links to be traversed (that is to say, of switches to be passed) simply narrows down to making the algorithm turn with states of links which are mutually equal and with a random order in which they are activated.

Tests have been made on the three types of different networks which networks correspond to FIGS. 1 to 3. The operation of the arrangement according to the invention has been compared with certain algorithms selected by G. Scheys in cited document in the preamble: the Ford-Moore algorithm and Pape algorithm.

Figure 4:
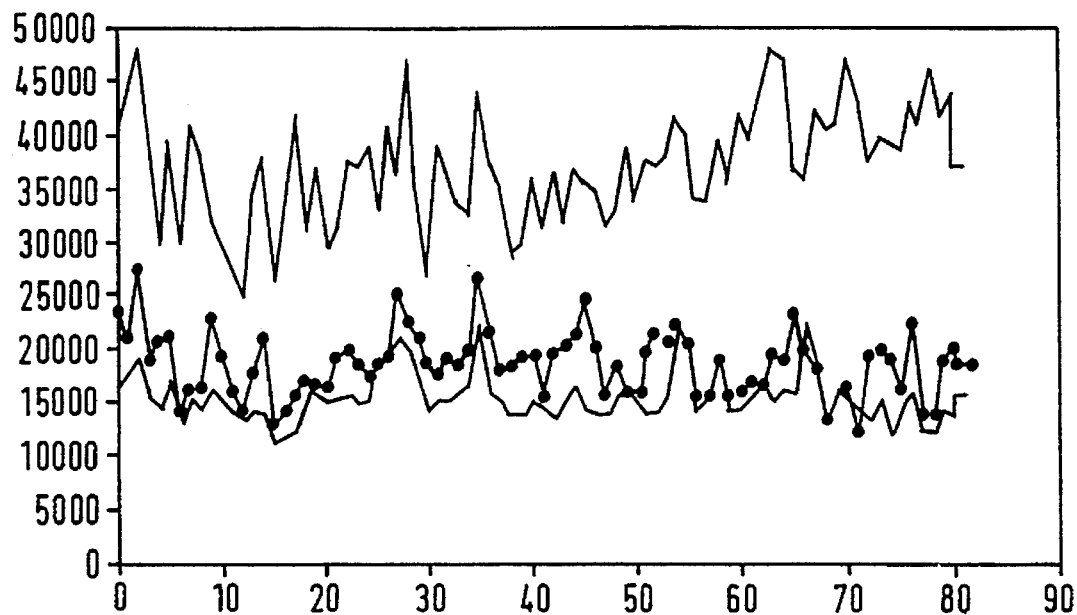
FIGS. 4, 6, 8 are curves showing the calculating time necessary for optimizing the routes in the networks of the respective FIGS. 1, 2 and 3.
Figure 5:
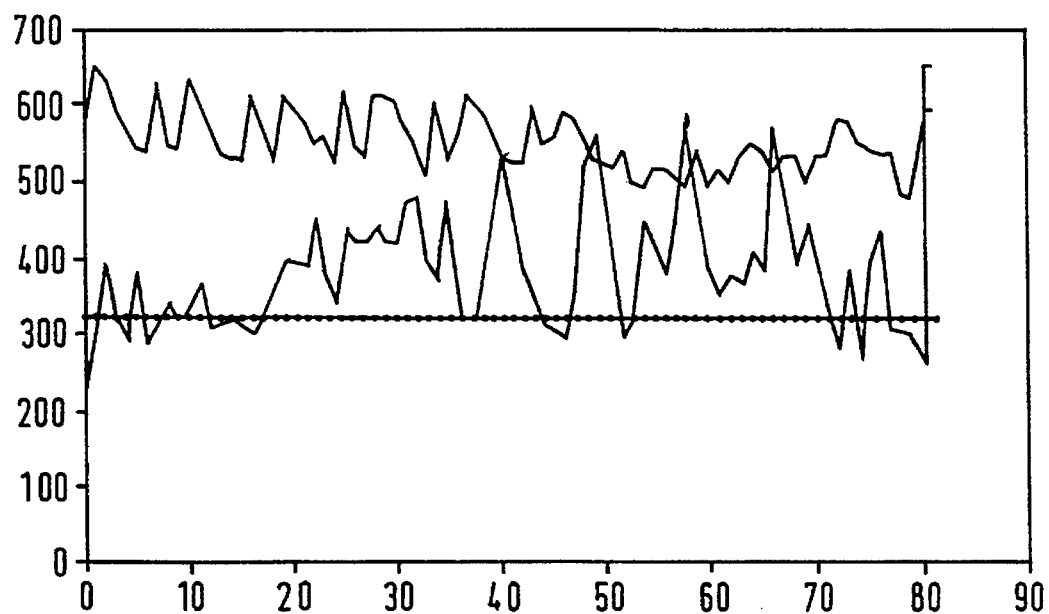
FIGS. 5, 7 and 9 are curves showing the size of the memory necessary for optimizing the routes in the networks of the respective FIGS. 1, 2 and 3.
Figure 6:
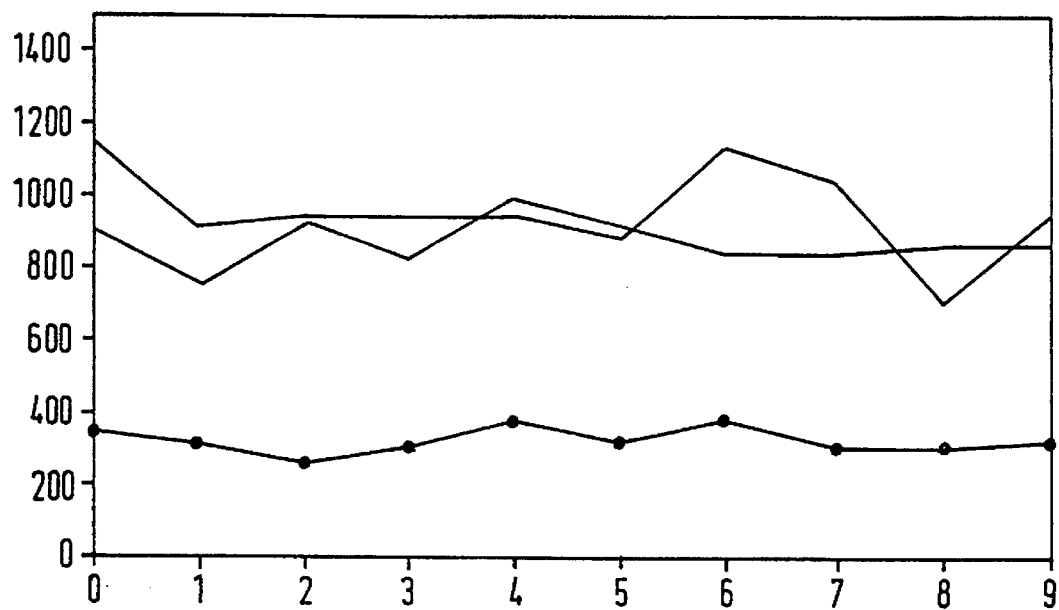
Figure 7:
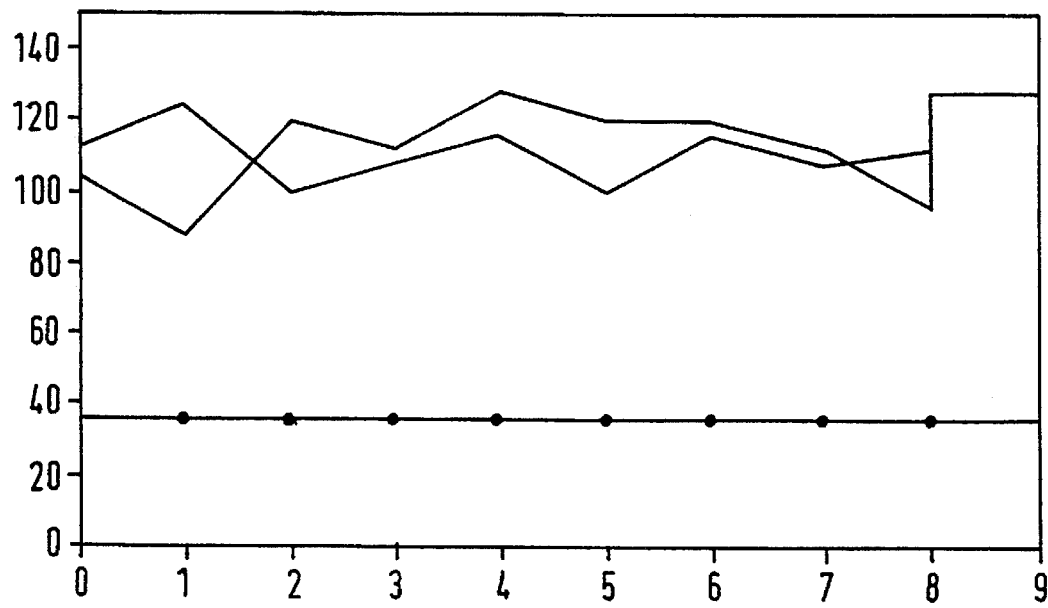
Figure 8:
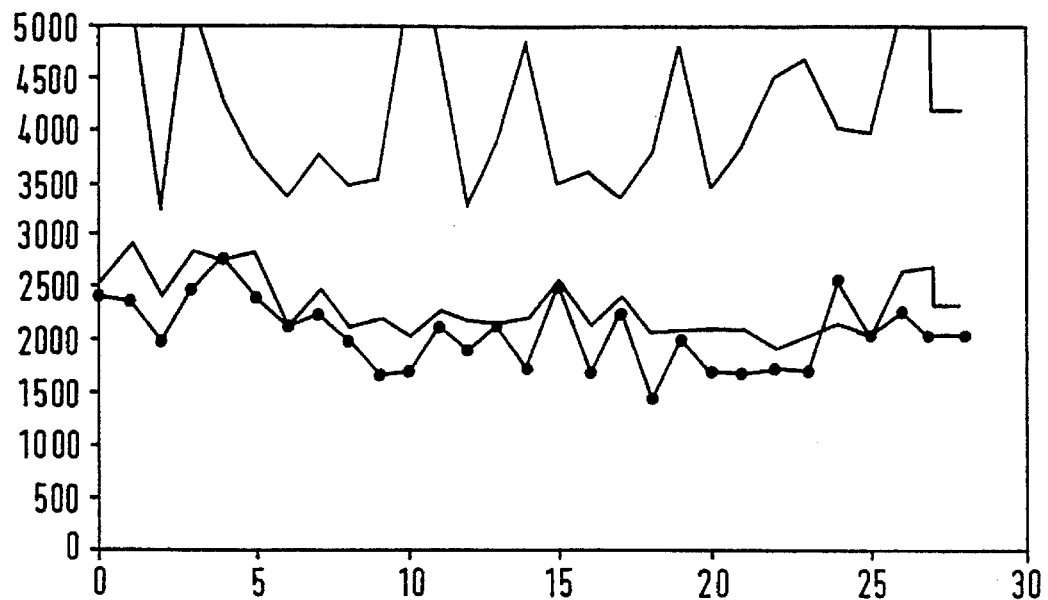
Figure 9:
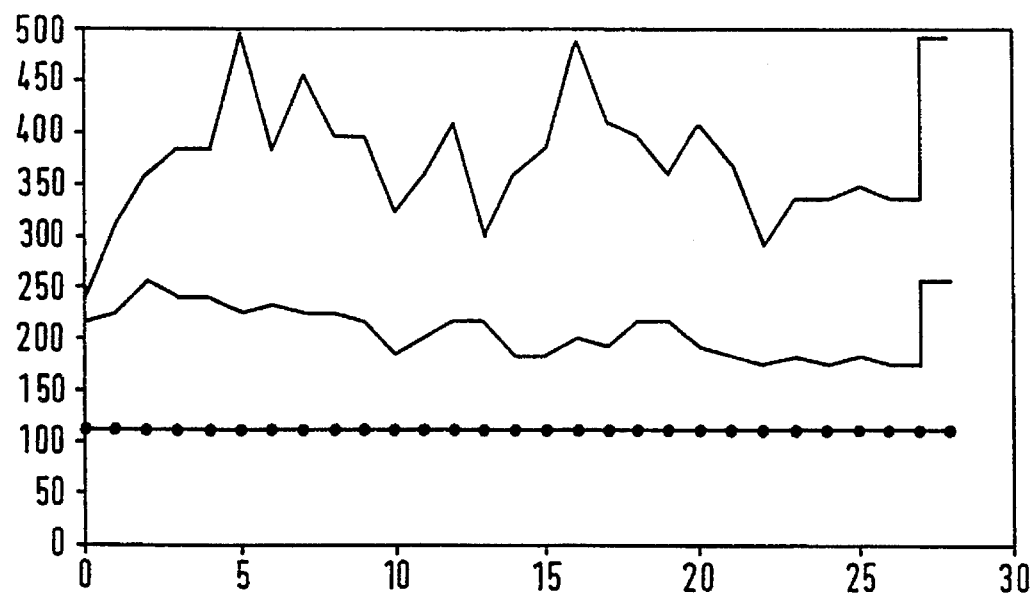

The test is carded out in the following manner: the shortest path routing tree is sought from each node "s" and this for T=20 different network states. These T states in fact result from T random extracts from the matrix $(C_{ij})(t)$ with $0<C_{ij}\leq 2.0$ for the existing links i–j and $1\leq t \leq T$. Then the measurements used in the algorithms during the calculation of the T routing trees are shown in the curves represented by FIGS. 4 to 9. The most solid line y corresponds to the Ford-Moore algorithm, the thinnest line to Pape's algorithm and the dotted line to the algorithm according to the invention. FIGS. 4 and 5 relate to the network of FIG. 1, FIGS. 6 and 7 relate to the network of FIG. 2 and FIGS. 8 and 9 relate to the network of FIG. 3. The even-numbered Figures present, as a function of the number of the node "s" in the network, the average period of time necessary to calculate the routing, averaged over the T routing tree structures (each node calculates the path starting from that node itself, that is to say, is always taken as node "s", so as to have a list of solutions available for all possible cases), and the odd-numbered Figures the maximum value of the assigned dynamic memory for that T routing tree structure that claims to have the most solutions.

Furthermore, the average value for the routing time of all the nodes "s" (for the FIGS. 4, 6 and 8) and the maximum value of the assigned memory in the worst case among all the nodes "s" (for the FIGS. 5, 7 and 9) are represented on these curves in the form of an $(N+1)^{th}$ node of the network (which obviously does not exist).

The algorithms have been described in the so-called C language on a "SUN" machine and compiled by the C++2.0 compiler. The measures have been carried out on a "SUN SPARC 4/65/32 Mo" machine.

There may be established that the algorithm based on the cellular automatons has been found to perform better in terms of speed, memory used and complexity of the code, at least for networks of limited complexity. When the dimension of the network increases, the algorithm based on the cellular automatons becomes less rapid than the Ford-Moore algorithm, but as the networks mostly have a hierarchical structure which permits the breaking up of the networks into smaller elements which can be processed separately, large networks will not occur in practice.

I claim:

1. A telecommunication network comprising nodes interconnected by communication links, and a decentralized arrangement for finding the path of least cost for transmission between two nodes based on an adaptive search, wherein each path includes at least one of said links, and each node comprises means for storing cost data for each of said links, characterized in that:

each of the nodes comprises a cellular automaton formed by a respective plurality of cells interconnected by simulated links, the cells and simulated links being respectively arranged to represent the nodes and communication links, all the simulated links connected to a particular cell being defined as simulated neighbor links extending to neighbor cells, each of the nodes comprises means, associated with each of the cells in that node, for calculating the cost of respective paths to each of the other cells in that node, a plurality of the paths being formed by respective pluralities of simulated links serially connected through respective cells, each said neighbor cell comprises means for transmitting to said particular cell cost data for paths from that neighbor cell to other cells in that node, one of said plurality of paths extends from a first cell over a first said simulated neighbor link to a first said neighbor cell, and thence over a path portion to a second cell, and the means for calculating associated with the first cell calculates cost over the one path based on cost from the first cell to the first neighbor cell, and cost data provided from the first neighbor cell for the path portion to the second cell.

2. A network as claimed in claim 1, characterized in that each cell comprises means for communicating with only its respective neighbor cells to which it is directly connected by said simulated neighbor links.

3. A telecommunication network comprising nodes interconnected by communication links, and a decentralized arrangement for finding the path of least cost for transmission between two nodes based on an adaptive search, wherein each path includes at least one of said links, and each node comprises means for storing cost data for each of said links, characterized in that:

each of the nodes comprises a cellular automaton formed by a respective plurality of cells interconnected by simulated links, the cells and simulated links being respectively arranged to represent the nodes and communication links, all the simulated links connected to a particular cell being defined as simulated neighbor links extending to neighbor cells, each of the nodes comprises means, associated with each of the cells in that node, for calculating the cost of respective paths to each of the other cells in that node, a plurality of the paths being formed by respective pluralities of simulated links serially connected through respective cells, each said neighbor cell comprises means for transmitting to said particular cell cost data for paths from that neighbor cell to other cells in that node, to determine the path of at least cost from a node i to a node j, the cell i corresponding to node i receives, from each neighbor cell k, the cost data for the lowest cost path from cell k to cell j which is most recently calculated in said cell k, and identification of said lowest cost path from cell k to cell j, cell i comprises means for selecting, from the respective sums of the cost from cell i to each respective neighbor cell k plus the cost data to cell j respectively received from each of the neighbor cells, the lowest cost data and corresponding path from cell i to cell j, and for storing the selected lowest cost data and path, and cell i comprises means for subsequently transmitting, to each of its neighbor cells, the stored lowest cost data and corresponding path from cell i to cell j.

4. A network as claimed in claim 3, characterized in that the calculating means in each cell comprises means for communicating with the respective calculating means in only its respective neighbor cells.

5. A network as claimed in claim 3, characterized in that the calculating means in cell i is asynchronous with respect to the calculating means in the cells other than cell i.

6. A network as claimed in claim 3, wherein each cellular automaton is formed by a respective sequential computing machine, characterized in that the sequential computing machines are respectively programmed to select the order in cost data for cells are calculated, based on the minimum number of links to be traversed to connect two nodes.

7. A network as claimed in claim 6, characterized in that the sequential computing machines are respectively programmed to make the automaton run when the states of the simulated links are respectively equal.

8. A network as claimed in claim 6, characterized in that the calculating means in cell i is asynchronous with respect to the calculating means in the cells other than cell i.

9. A network as claimed in claim 6, characterized in that the calculating means in each cell comprises means for communicating with the respective calculating means in only its respective neighbor cells.

10. A network as claimed in claim 9, characterized in that the calculating means in cell i is asynchronous with respect to the calculating means in the cells other than cell i.

11. A decentralized arrangement in a first node of a telecommunication network comprising a plurality of said nodes interconnected by communication links, for finding the path of least cost for transmission between the first node and another node based on an adaptive search, wherein each path includes at least one of said links, and each node comprises means for storing cost data for each of said links, characterized in that the arrangement comprises:

a cellular automaton formed by a respective plurality of cells interconnected by simulated links, the cells and simulated links being respectively arranged to represent the nodes and communication links, all the simulated links connected to a particular cell being defined as simulated neighbor links extending to neighbor cells, means, associated with each of the cells, for calculating the cost of respective paths to each of the other cells, a plurality of the paths being formed by respective pluralities of simulated links serially connected through respective cells, each said neighbor cell comprises means for transmitting to said particular cell cost data for paths from that neighbor cell to other cells, to determine the path of least cost from the first node to a node j, the cell i corresponding to the first node receives, from each neighbor cell k, the cost data for the lowest cost path from cell k to cell j which is most recently calculated in said cell k, and identification of said lowest cost path from cell k to cell j, cell i comprises means for selecting, from the respective sums of the cost from cell i to each respective neighbor cell k plus the cost data to cell j respectively received from each of the neighbor cells, the lowest cost data and corresponding path from cell i to cell j, and for storing the selected lowest cost data and path, and cell i comprises means for subsequently transmitting, to each of its neighbor cells, the stored lowest cost data and corresponding path from cell i to cell j.

12. An arrangement as claimed in claim 11, characterized in that the calculating means in each cell comprises means for communicating with the respective calculating means in only its respective neighbor cells.

13. An arrangement as claimed in claim 11, characterized in that the calculating means in cell i is asynchronous with respect to the calculating means in the cells other than cell i.

14. An arrangement as claimed in claim 11, wherein each cellular automaton is formed by a respective sequential computing machine, characterized in that the sequentially computing machines are respectively programmed to select the order in cost data for cells are calculated, based on the minimum number of links to be traversed to connect two nodes.

15. An arrangement as claimed in claim 14, characterized in that the sequentially computing machines are respectively programmed to make the automaton run when the states of the simulated links are respectively equal.

16. A network as claimed in claim 14, characterized in that the calculating means in cell i is asynchronous with respect to the calculating means in the cells other than cell i.

17. An arrangement as claimed in claim 14, characterized in that the calculating means in each cell comprises means for communicating with the respective calculating means in only its respective neighbor cells.

18. An arrangement as claimed in claim 17, characterized in that the calculating means in cell i is asynchronous with respect to the calculating means in the cells other than cell i.

* * * * *